US011929249B2

(12) United States Patent
Qian

(10) Patent No.: US 11,929,249 B2
(45) Date of Patent: Mar. 12, 2024

(54) METHODS FOR FORMING A FIELD EMISSION CATHODE

(71) Applicant: NCX Corporation, Raleigh, NC (US)

(72) Inventor: Cheng Qian, Cary, NC (US)

(73) Assignee: NCX Corporation, Raleigh, NC (US)

( * ) Notice: Subject to any disclaimer, the term of this patent is extended or adjusted under 35 U.S.C. 154(b) by 0 days.

(21) Appl. No.: 18/252,992

(22) PCT Filed: Nov. 16, 2021

(86) PCT No.: PCT/IB2021/060611
§ 371 (c)(1),
(2) Date: May 15, 2023

(87) PCT Pub. No.: WO2022/106996
PCT Pub. Date: May 27, 2022

(65) Prior Publication Data
US 2023/0420211 A1 Dec. 28, 2023

Related U.S. Application Data

(60) Provisional application No. 63/114,774, filed on Nov. 17, 2020.

(51) Int. Cl.
*H01J 9/02* (2006.01)

(52) U.S. Cl.
CPC .................................... *H01J 9/025* (2013.01)

(58) Field of Classification Search
CPC ... H01J 9/022; H01J 9/025; H01J 2201/30434
USPC ............................................................ 445/51
See application file for complete search history.

(56) References Cited

U.S. PATENT DOCUMENTS

2003/0143398 A1* 7/2003 Ohki ...................... B82Y 10/00 423/447.2
2004/0055892 A1* 3/2004 Oh ......................... C25D 15/00 205/109
2004/0070326 A1* 4/2004 Mao ........................ H01J 1/304 313/311
2006/0057927 A1* 3/2006 Kang ..................... B82Y 10/00 445/46

(Continued)

FOREIGN PATENT DOCUMENTS

WO WO 2005/113432 12/2005
WO WO 2009/117460 9/2009
WO WO-2022091002 A1 * 5/2022

OTHER PUBLICATIONS 250-450 Sonifer Analog Cell Disruptor User's Manual EDP 100-413-016 Rev. C, Branson Ultrasonics Corporation, Jan. 31, 2011 (Year: 2011).*

(Continued)

*Primary Examiner* — Christopher M Raabe
(74) *Attorney, Agent, or Firm* — Womble Bond Dickinson(US) LLP

(57) ABSTRACT

A method for fabricating an electron field emission cathode, the field emission cathode including a substrate having a field emission material layer engaged therewith, where the field emission material incorporates a carbon nanotube material and a metal oxide. The field emission material is produced via a sol-gel process to improve field emission characteristics of the field emission cathode and field emission cathode devices implementing such cathodes.

21 Claims, 3 Drawing Sheets

(56) References Cited

U.S. PATENT DOCUMENTS

Figure 1:
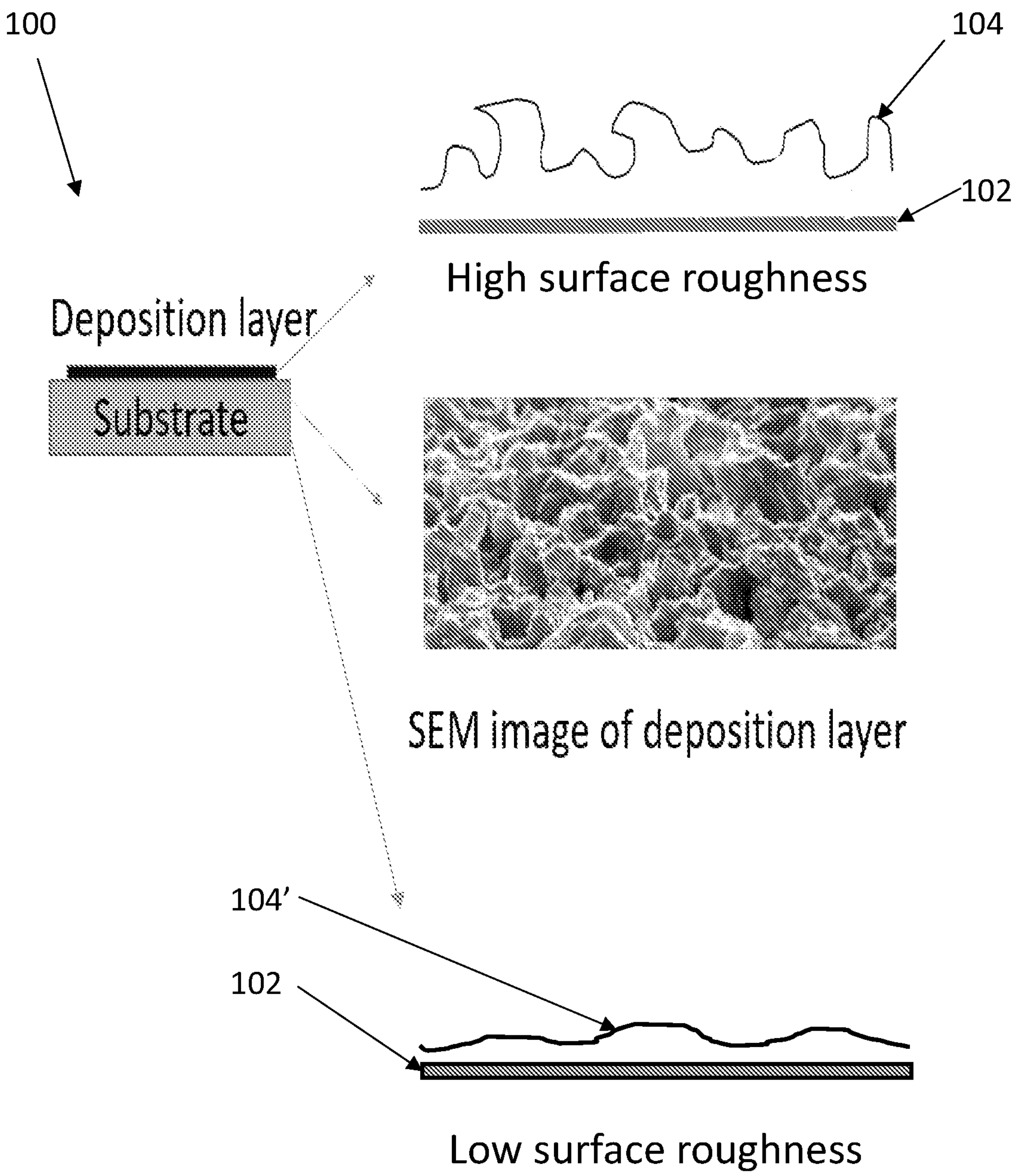

2009/0121606 A1 * 5/2009 Okubo .................. B82Y 30/00
313/311

OTHER PUBLICATIONS

Djelad, Halima et al., "Reactive Insertion of PEDOT-PSS in SWCNT@Silica Composites and its Electrochemical Performance", Materials, vol. 13(5), Mar. 6, 2020, p. 1200.

Jung, Hyuck et al, "A multi-wall carbon nanotube/polymethyl methacrylate composite for use in field emitters on flexible substrates", Oct. 1, 2011, vol. 50(3), p. 987-993, [retrieved on Oct. 6, 2011].

* cited by examiner

METHODS FOR FORMING A FIELD EMISSION CATHODE

CROSS-REFERENCE TO RELATED APPLICATIONS

This application is a national stage filing under 35 U.S.C. 371 of PCT/IB2021/060611, filed Nov. 16, 2021, which International Application was published by the International Bureau in English on May 27, 2022, as WO 2022/106996, and application claims priority from U.S. Application No. 63/114,774, filed on Nov. 17, 2020, which applications are hereby incorporated in their entirety by reference in this application.

BACKGROUND

Field of the Disclosure

The present application relates to methods of fabricating a field emission cathode device and, more particularly, to methods of forming a field emission cathode incorporating carbon nanotubes and a metal oxide utilizing a sol-gel process to improve field emission characteristics of the cathode and field emission cathode devices implementing such cathodes.

Description of Related Art

A field emission cathode device generally includes a cathode substrate (usually comprised of a metal or other conducting material such as an alloy, conductive glass, metalized ceramics, doped silicon), a layer of a field emission material (e.g., nanotubes, nanowires, graphene) disposed on the substrate, and, if necessary, an additional layer of an adhesion material disposed between the substrate and the field emission material. Some typical applications of a field emission cathode device include, for example, electronics operable in a vacuum environment, field emission displays, and X-ray tubes.

Carbon nanotubes may be used in the fabrication of cold field emission cathodes. However, the carbon nanotubes do not typically disperse well and/or are not stable during current electrophoresis processes, resulting in poor uniformity of the emitters on the surface of the cathodes and significant batch to batch variation of the cathodes. In addition, cathodes made by an electrophoretic deposition method generally vary batch to batch due to the concentration change of components in the suspension used in the process of electrophoretic deposition. This is a major drawback for large-scale industrial production processes.

Additionally, certain processes have attempted to improve the uniformity of emitters on a cathode surface by making more homogeneous layer material precursors including matrix particles. Because the particles used in the layer material precursors are not uniform in size due to wide size distribution (e.g., from 300 nanometers to 3 micrometers), after the annealing and activation steps, the surface roughness of the layer is high, resulting in a wide distribution of emitters on different height levels all over the surface of cathodes. Only those emitters on the highest level can contribute to emit electrons since those in the lower levels are electrically shielded and cannot emit electrons effectively. Moreover, loose particles remain in the lower levels and cannot be completely removed in the activation step, resulting in limited emission properties, such as low emission current, high turn on voltage, short emission lifetime, and large batch to batch variations.

Thus, there is a need for a process for improving the production of a field emission matrix material to obtain field emission cathodes having a high density of emitters distributed on their surfaces with a high uniformity and low batch-to-batch variations, thereby improving the field emission characteristics of the cathodes, such as emission current, turn on voltage and emission lifetime.

SUMMARY OF THE DISCLOSURE

The above and other needs are met by aspects of the present disclosure which includes, without limitation, the following example embodiments and, in one particular aspect, a method of forming a field emission cathode with low surface roughness by using a sol-gel process, where the method includes forming a field emission material by mixing a plurality of carbon nanotubes and a solution comprising a water stable conducting polymer (e.g., a poly(3,4-ethylendioxythiophene)-poly(styrene sulfonic acid) in water at a particular ratio (e.g., from about 1:10 to about 10:1 by weight) of the carbon nanotubes to the polymer solution to form a base mixture, exposing the base mixture to a strong ultrasonic dispersion method (e.g., a power of greater than 1 $W/cm^2$ and at a frequency of about 20-50 kHz), introducing a metal oxide sol solution to the base mixture to form a field emission material precursor (i.e., a modified base mixture), exposing the field emission material precursor to a mild ultrasonic dispersion method (e.g., a power of less than 1 $W/cm^2$ and at a frequency of greater than 50 kHz) to form a stable solution of the field emission material precursor, and introducing a polar additive into the stable solution of the field emission material precursor to form a final sol solution as a final field emission material precursor; depositing a layer of the final field emission material on to at least a portion of a substrate; drying the layer and the substrate at a temperature of about 30° C. to about 150° C. at atmosphere or under a vacuum; annealing the layer and the substrate at a temperature of about 500° C. to about 1000° C. under a vacuum to form a field emission material; and activating the field emission material to form the field emission cathode.

Another example aspect provides a method of forming a field emission material precursor, where the method includes introducing a plurality of carbon nanotubes and a solution comprising a water stable conducting polymer (e.g., a poly(3,4-ethylendioxythiophene)-poly(styrene sulfonic acid)) in a liquid medium at a particular ratio (e.g., from about 1:10 to about 10:1 by weight) of the carbon nanotubes to the polymer solution; mixing the plurality of carbon nanotubes and the solution via a strong ultrasonic dispersion method (e.g., a power of greater than 1 $W/cm^2$ and at a frequency of about 20-50 kHz) to form a base mixture; introducing a metal oxide sol solution into the base mixture to form a modified base mixture; exposing the modified base mixture comprising the metal oxide sol solution to a mild ultrasonic dispersion method (e.g., a power of less than 1 $W/cm^2$ and at a frequency of greater than 50 kHz) to form a stable solution of a field emission material precursor, and introducing a polar additive into the stable solution of the field emission material precursor to form a final sol solution as the final field emission material precursor.

Another example aspect provides a method of forming a field emission cathode, where the method includes depositing a field emission material precursor (e.g., the final field emission material precursor) on at least a portion of a substrate, drying the field emission material and the substrate at a temperature of about ° C. to about 150° C. at atmosphere or under a vacuum such that the final field emission material precursor forms a layer on the substrate, annealing the final field emission material precursor layer and the substrate at a temperature of about 500° C. to about 1000° C. under a vacuum such that the layer forms a field emission material, and activating the field emission material to form the field emission cathode. These methods provide for decreased batch to batch variation of cathodes in large production processes.

Yet another example aspect provides for a field emission cathode device, where the field emission cathode is fabricated in accordance with any one of the proceeding aspects to obtain a cathode device. The cathode has an improved density and uniformity of the field emitters on the surface of the cathode, thereby resulting in a cathode device with improved field emission characteristics, such as high emission current, low turn on voltage and longer emission lifetime.

The present disclosure thus includes, without limitation, the following example embodiments:

Example Embodiment 1: A method of forming a field emission cathode, comprising mixing a plurality of carbon nanotubes and a solution at a particular ratio to form a base mixture, the solution comprising a water stable conducting polymer in a liquid medium; exposing the base mixture to an ultrasonic dispersion process at a power of greater than 1 $W/cm^2$ and at a frequency of 20-50 kHz; introducing a metal oxide sol solution to the base mixture to form a field emission material precursor; exposing the field emission material precursor to an ultrasonic dispersion process at a power of less than 1 $W/cm^2$ and at a frequency of greater than 50 kHz to form a stable solution of the field emission material precursor; introducing a polar additive into the stable solution of the field emission material precursor to form a final sol solution as a final field emission material precursor; depositing a layer of the final field emission material precursor on at least a portion of a substrate; drying the layer of the final field emission material precursor and the substrate at a temperature of 30° C. to 150° C. at atmosphere or under a vacuum such that the layer of the final field emission material precursor forms a uniform gel layer on the substrate; annealing the gel layer and the substrate at a temperature of 500° C. to 1000° C. under a vacuum such that the gel layer forms a field emission material; and activating the field emission material to form the field emission cathode.

Example Embodiment 2: The method of any preceding example embodiment, or combinations thereof, wherein mixing the plurality of carbon nanotubes and the solution comprises mixing the plurality of carbon nanotubes and the solution comprising a poly(3,4-ethylendioxythiophene)-poly(styrene sulfonic acid) (PEDOT:PSS) polymer and the liquid medium.

Example Embodiment 3: The method of any preceding example embodiment, or combinations thereof, wherein mixing the plurality of carbon nanotubes and the solution comprises mixing the plurality of carbon nanotubes and the PEDOT:PSS solution such that the particular ratio of carbon nanotubes to PEDOT:PSS polymer solution is from 10:1 to 1:10 by weight.

Example Embodiment 4: The method of any preceding example embodiment, or combinations thereof, wherein mixing the plurality of carbon nanotubes and the solution comprises mixing the plurality of carbon nanotubes and the solution, with the liquid medium of the solution comprising water.

Example Embodiment 5: The method of any preceding example embodiment, or combinations thereof, wherein depositing the layer of the final field emission material precursor on the substrate comprises depositing the layer on to the substrate via dip-coating, spin-coating, air knife coating, gravure coating, slot die coating, inkjet printing, spray coating, Meyer bar coating, lithography coating, flexography coating, or combinations thereof.

Example Embodiment 6: The method of any preceding example embodiment, or combinations thereof, wherein introducing the metal oxide sol solution to the base mixture comprises introducing the metal oxide sol solution selected from the group consisting of aluminum oxide ($Al_2O_3$), silicon dioxide ($SiO_2$), titanium dioxide ($TiO_2$), zinc oxide (ZnO), magnesium oxide (MgO), barium oxide (BaO), lead dioxide ($PbO_2$), zirconium dioxide ($ZrO_2$), molybdenum dioxide ($MoO_2$), copper oxide (CuO), vanadium pentoxide ($V_2O_5$), tin dioxide ($SnO_2$), indium tin oxide (ITO), indium zinc oxide (IZO), and aluminum zinc oxide (AZO), or a combination thereof.

Example Embodiment 7: The method of any preceding example embodiment, or combinations thereof, wherein introducing the polar additive into the stable solution comprises introducing the polar additive, selected from the group consisting of an alcohol, a polyol, ethylene glycol, glycerol, meso-erythritol, xylitol, and D-sorbitol, dimethylformamide (DMF), Dimethyl sulfoxide (DMSO), Dimethylsulfone ($DMSO_2$), N-mehtyl-2-pyrrolidone (NMP), an ionic liquid, or combinations thereof, into the stable solution.

Example Embodiment 8: The method of any preceding example embodiment, or combinations thereof, wherein depositing the layer of the final field emission material precursor on the substrate comprises depositing the layer of the final field emission material precursor on the substrate comprising a metal, stainless steel, an alloy, a conductive glass, or a ceramic.

Example Embodiment 9: The method of any preceding example embodiment, or combinations thereof, wherein activating the layer of the field emission material comprises applying an adhesive tape to a surface of the field emission material; and removing the adhesive tape from the surface.

Example Embodiment 10: The method of any preceding example embodiment, or combinations thereof, wherein activating the layer of the field emission material comprises applying a curable adhesive to a surface of the field emission material; exposing the adhesive to a heat source or an ultraviolet light to cure the adhesive and form the adhesive into an adhesive film; and removing the adhesive film from the surface.

Example Embodiment 11: A method of forming a field emission material precursor, comprising introducing a plurality of carbon nanotubes into a liquid medium; introducing a water stable conducting polymer into the liquid medium comprising the plurality of carbon nanotubes, wherein the plurality of carbon nanotubes is present at a particular ratio to a solution comprising the liquid medium and the polymer; mixing the plurality of carbon nanotubes and the water stable conducting polymer in the liquid medium via an ultrasonic dispersion process at a power of greater than 1 $W/cm^2$ and at a frequency of 20-50 kHz to form a base mixture; introducing a metal oxide sol solution into the base mixture; exposing the base mixture including the metal oxide sol solution to an ultrasonic dispersion process at a power of less than 1 $W/cm^2$ and at a frequency of greater than 50 kHz to form a stable solution of a field emission material precursor; and introducing a polar additive into the stable solution of the field emission material precursor to form a final field emission material precursor.

Example Embodiment 12: The method of any preceding example embodiment, or combinations thereof, wherein introducing the plurality of carbon nanotubes into the liquid medium comprises introducing the plurality of carbon nanotubes into water.

Example Embodiment 13: The method of any preceding example embodiment, or combinations thereof, wherein introducing the water stable conducting polymer comprises introducing a poly(3,4-ethylendioxythiophene)-poly(styrene sulfonic acid) (PEDOT:PSS) polymer into the liquid medium.

Example Embodiment 14: The method of any preceding example embodiment, or combinations thereof, wherein mixing the plurality of carbon nanotubes and the solution comprises mixing the plurality of carbon nanotubes and the PEDOT:PSS solution such that the particular ratio of carbon nanotubes to PEDOT:PSS solution is from 10:1 to 1:10 by weight.

Example Embodiment 15: The method of any preceding example embodiment, or combinations thereof, wherein introducing the metal oxide sol solution to the base mixture comprises introducing the metal oxide sol solution selected from the group consisting of aluminum oxide ($Al_2O_3$), silicon dioxide ($SiO_2$), titanium dioxide ($TiO_2$), zinc oxide (ZnO), magnesium oxide (MgO), barium oxide (BaO), lead dioxide ($PbO_2$), zirconium dioxide ($ZrO_2$), molybdenum dioxide ($MoO_2$), copper oxide (CuO), vanadium pentoxide ($V_2O_5$), tin dioxide ($SnO_2$), indium tin oxide (ITO), indium zinc oxide (IZO), an Azo compound, or a combination thereof.

Example Embodiment 16: The method of any preceding example embodiment, or combinations thereof, wherein introducing the polar additive into the stable solution comprises introducing the polar additive, selected from the group consisting of an alcohol, a polyol, ethylene glycol, glycerol, meso-erythritol, xylitol, and D-sorbitol, dimethylformamide (DMF), Dimethyl sulfoxide (DMSO), Dimethylsulfone ($DMSO_2$), N-methyl-2-pyrrolidone (NMP), an ionic liquid, or combinations thereof, into the stable solution.

Example Embodiment 17: A method of forming a field emission cathode, comprising depositing the final field emission material precursor according to the method of any preceding example embodiment, or combinations thereof, on at least a portion of a substrate; drying the final field emission material precursor and the substrate at a temperature of 30° C. to 150° C. at atmosphere or under a vacuum such that the final field emission material precursor forms a layer on the substrate; annealing the layer and the substrate at a temperature of 500° C. to 1000° C. under a vacuum such that the layer forms a field emission material; and activating the field emission material to form the field emission cathode.

Example Embodiment 18: The method of any preceding example embodiment, or combinations thereof, wherein depositing the final field emission material precursor on the at least a portion of the substrate comprises depositing the final field emission material precursor on the at least a portion of the substrate comprising a metal, stainless steel, an alloy, a conductive glass, or a ceramic.

Example Embodiment 19: The method of any preceding example embodiment, or combinations thereof, wherein depositing the final field emission material precursor on the at least a portion of the substrate comprises depositing the final field emission material precursor on the at least a portion of the substrate via dip-coating, spin-coating, air knife coating, gravure coating, slot die coating, inkjet printing, spray coating, Meyer bar coating, lithography coating, flexography coating or combinations thereof.

Example Embodiment 20: The method of any preceding example embodiment, or combinations thereof, wherein activating the field emission material comprises applying an adhesive tape to a surface of the field emission material; and removing the adhesive tape from the field emission material.

Example Embodiment 21: The method of any preceding example embodiment, or combinations thereof, wherein activating the field emission material comprises applying a curable adhesive to a surface of the field emission material; exposing the adhesive to a heat source or an ultraviolet light to cure the adhesive and form the adhesive into an adhesive film; and removing the adhesive film from the surface.

Example Embodiment 22: A field emission cathode device comprising a field emission cathode fabricated in accordance with the method of any preceding example embodiment, or combinations thereof.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Figure 2:
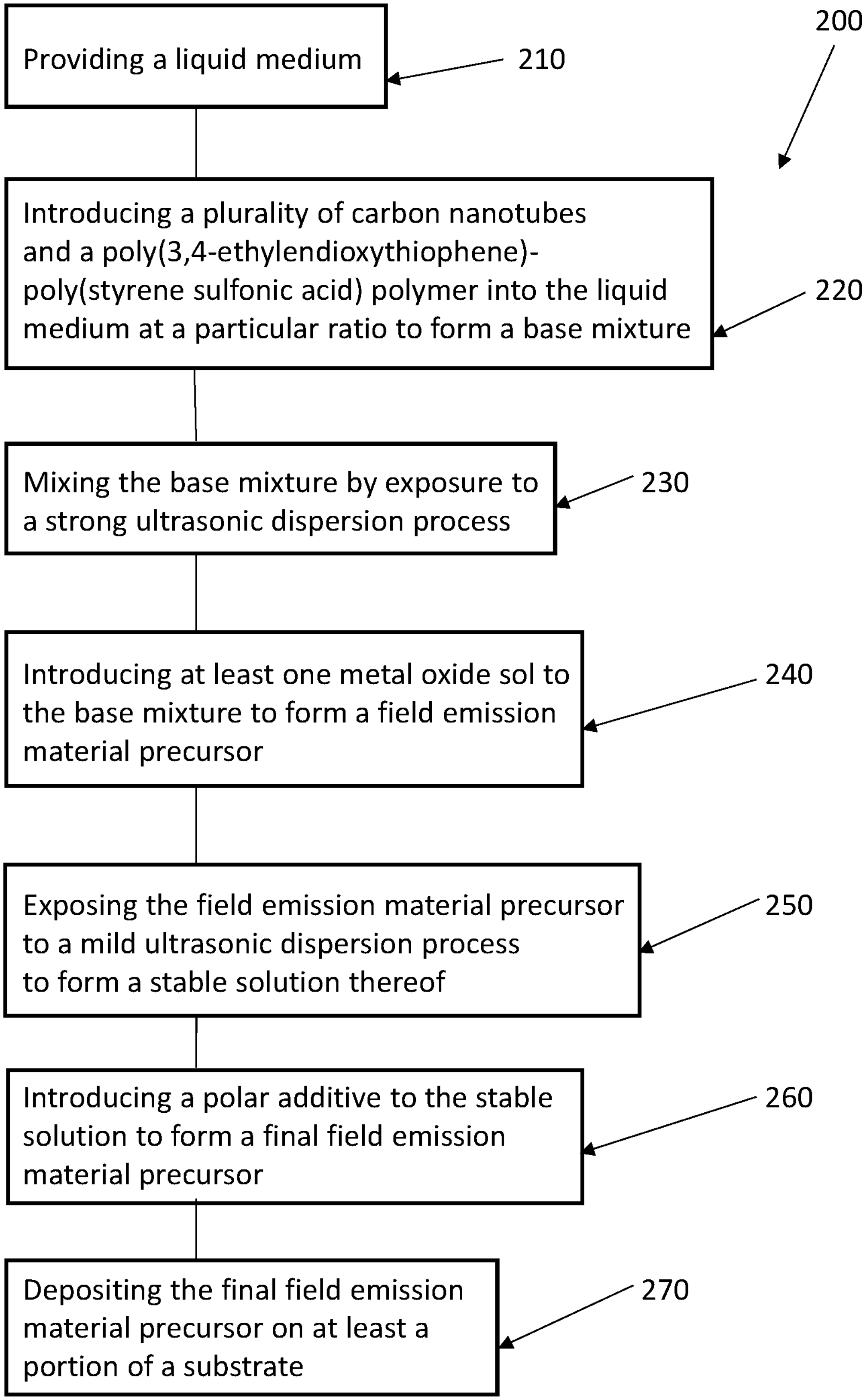
Figure 3:
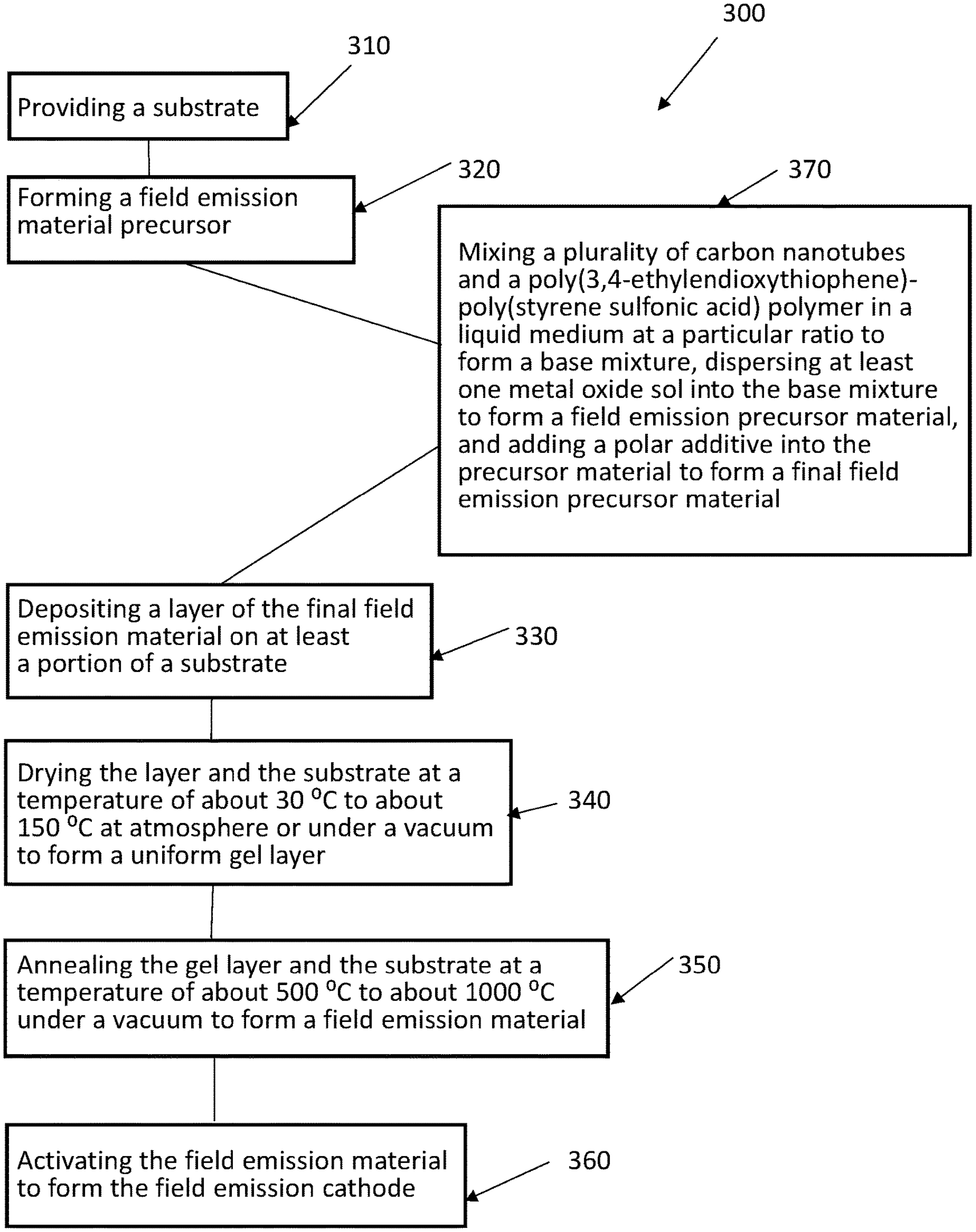

Having thus described the disclosure in general terms, reference will now be made to the accompanying drawings, which are not necessarily drawn to scale, and wherein:

FIG. 1 schematically illustrates an example of a field emission cathode and the nature of the field emission material deposition layer engaged with the cathode substrate, according to one or more aspects of the present disclosure;

FIG. 2 illustrates one example of a method of forming a field emission material precursor, according to one or more aspects of the present disclosure; and FIG. 3 illustrates one example of a method of forming a field emission cathode, according to one or more aspects of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates one example of a field emission cathode 100 that includes a substrate 102 and a layer of a field emission material 104 disposed on the substrate 102, and, if necessary, an additional layer of an adhesion material (not shown) disposed between the substrate 102 and the field emission material 104. The substrate 102 may be made of an electrically conductive material, such as a metallic material, such as a solid metal or alloy (e.g., stainless steel, doped silicon), conductive glass (e.g., Indium Tin Oxide (ITO) coated glass or other fused glass having a conductive coating on the surface); or a conductive ceramic (e.g., a metalized ceramic, such as aluminum oxide, beryllium oxide, and aluminum nitride). The field emission material 104 includes a plurality of carbon nanotubes (CNT) disposed within a matrix material. Typical CNT/matrix field emission materials have a high surface roughness, for example, surfaces with emitters disposed on different height layers across the surface of the cathodes and contamination of the emitters disposed on the lower height layers, because many loose particles are not removed therefrom during the activation process.

By forming the layer of field emission material 104' via a sol-gel process and incorporating a metal oxide sol solution results in a gel layer of a CNT/PEDOT:PSS/metal oxide matrix in a nanometer composite structure, which is uniform in texture, formed on the surface of the substrate 102. After drying, annealing, and activation, a field emission cathode is obtained with less roughness of the field emission material layer and the characteristics of high emitter density, high emission current, low turn on voltage and long lifetime. In particular, the incorporation of the metal oxide sol solution, instead of matrix particles, results in a homogeneous precursor solution that can be deposited on the surface of a substrate. The deposition of the field emission material on to the substrate 102 may be carried out via any of the coating processes disclosed herein. After activation, the surfaces of the cathodes have low surface roughness (e.g., less variation of emitter heights and most of the loose particles removed. The two layers (high roughness layer 104 and low roughness layer 104') are depicted in FIG. 1 for comparative purposes.

Thus, the cathodes have not only high density and uniformity of emitters but also improved field emission properties with low batch to batch variation that can meet requirements of large production for industrial applications. FIG. 2 illustrates a method 200 of forming a field emission material precursor including carbon nanotubes and a metal oxide. In one aspect of the method, a liquid medium, such as water, is provided (step 210) into which a plurality of carbon nanotubes and a poly(3,4-ethylendioxythiophene)-poly(styrene sulfonic acid) (PEDOT:PSS) polymer are introduced at a particular ratio, such as, for example, a ratio of the plurality of carbon nanotubes to a solution comprising the liquid medium and the polymer that ranges from about 10:1 to about 1:10 by weight (step 220). In some embodiments, other liquid mediums comprising a water stable conducting polymer may be used. At step 230, the plurality of carbon nanotubes and the PEDOT:PSS solution are mixed via a strong ultrasonic dispersion process to form a base mixture. The mixing may be carried out at low frequency (20-50 kHz) and high power (>1 W/cm$^2$) for a period of time ranging from about 1 min to about 30 min. Next, a metal oxide sol solution is introduced into the base mixture (step 240) to form a modified base mixture. The modified base mixture (i.e., with the inclusion of the metal oxide sol) is exposed to a mild ultrasonic dispersion process to form a stable solution of the field emission material precursor (i.e., a homogenous precursor sol) (step 250). The mild ultrasonic dispersion process may be carried out at high frequency (>50 kHz) low power (<1 W/cm$^2$) and for a period of time ranging from about 30 minutes to about 24 hours. At step 260, a polar additive is introduced to the stable solution to form a final sol solution as a final field emission material precursor. In various embodiments, the final field emission material precursor may include the carbon nanotubes, the PEDOT:PSS, the metal oxide sol, and one or more additives.

The specific composition and quantities of the components may vary to suit a particular application. For example, in some embodiments, the metal oxide sol solution comprises, for example, aluminum oxide ($Al_2O_3$), silicon dioxide ($SiO_2$), titanium dioxide ($TiO_2$), zinc oxide (ZnO), magnesium oxide (MgO), barium oxide (BaO), lead dioxide ($PbO_2$), zirconium dioxide ($ZrO_2$), molybdenum dioxide ($MoO_2$), copper oxide (CuO), vanadium pentoxide ($V_2O_5$), tin dioxide ($SnO_2$), indium tin oxide (ITO), indium zinc oxide (IZO), and aluminum zinc oxide (AZO) The metal oxide sol may be dispersed into the base mixture at about to about 20 wt % of total liquid medium. In various embodiments, the polar additive may include one or more of alcohols, polyols, such as ethylene glycol, glycerol, meso-erythritol, xylitol, and D-sorbitol, dimethylformamide (DMF), Dimethyl sulfoxide (DMSO), Dimethylsulfone ($DMSO_2$), N-mehtyl-2-pyrrolidone (NMP), an ionic liquid, or combinations thereof. The concentration of the polar additive may be about 0.1 wt % to about 20 wt % of total liquid medium. The carbon nanotubes may be manufactured by a chemical vapor deposition process, a laser ablation process, and/or an arc discharge method.

Once the final field emission material precursor has been created in a stable sol solution, the final field emission material precursor may be deposited on at least a portion of the substrate (step 270). The layer of the final field emission material precursor is deposited on to the substrate via dip-coating, spin-coating, air knife coating, gravure coating, slot die coating, inkjet printing, spray coating, Meyer bar coating, lithography coating, flexography coating, or combinations thereof. The substrate may comprise a metal, stainless steel, an alloy, a conductive glass, or a ceramic. The substrate may be provided to the appropriate equipment via, for example, a robotic material handling system or manually by a user. The substrate is configured to receive a layer of the final field emission material precursor thereon.

The sol layer may be subjected to one or more other processes after deposition on the substrate, such as drying, annealing, and activating processes. After drying, a uniform gel layer of a CNT/PEDOT:PSS/metal oxide matrix material is formed from the sol layer on the surface of the substrate, which is then annealed. The field emission cathode is formed after activating the deposition layer on the substrate to form the field emission material.

FIG. 3 illustrates a method 300 of forming a field emission cathode using a field emission material comprising carbon nanotubes and a metal oxide. In one aspect of the method, a substrate, such as those described hereinabove, is provided to equipment configured for carrying out a deposition process (step 310). The method further includes forming a field emission material from a field emission material precursor (step 320). In some cases, the field emission material is created as a field emission material precursor prior to the substrate being provided, e.g., as the final field emission material precursor disclosed herein. A layer of the final field emission material precursor is deposited on to at least a portion of the substrate (step 330). The substrate may be made of a metal, such as stainless steel, an alloy, a conductive glass, or a metalized ceramic. The substrate may be provided to the appropriate equipment via, for example, a robotic material handling system or manually by a user.

The substrate and the layer of final field emission material precursor deposited thereon is then exposed to a drying process (step 340) and an annealing process (step 350) to form the field emission material. The drying process may be carried out at a temperature of about 30° C. to about 150° C. at atmosphere or under a vacuum. The annealing process may be carried out at a temperature of about 500° C. to about 1000° C. under a vacuum. At step 360, the layer of the field emission material is activated to obtain the field emission cathode. Activation may be carried out by applying an adhesive (e.g., an adhesive tape or a curable adhesive material) on to a surface of the layer of the field emission material and removing the adhesive from the layer of the field emission material.

Step 370 illustrates one example of a method of forming a field emission material precursor. At step 370, a plurality of carbon nanotubes and a PEDOT:PSS polymer are mixed into a liquid medium, such as water, at a particular ratio (e.g., from about 1:10 to about 10:1 by weight) of the plurality of carbon nanotubes to a solution comprising the liquid medium and the polymer. The components can be mixed via a strong ultrasonic dispersion process to form a base mixture, as described above. Next, a metal oxide sol solution is dispersed within the base mixture. The modified base mixture can be exposed to a mild ultrasonic dispersion process to form a stable suspension of the field emission material precursor, as described above. Next, a polar additive is added to the stable solution to form a final sol solution as a final field emission material precursor. In various embodiments, the final field emission material precursor may include the carbon nanotubes, the PEDOT:PSS, the metal oxide sol, and one or more additives.

The specific composition and quantities of the components may vary to suit a particular application. For example, in some embodiments, the metal oxide sol solution comprises, for example, aluminum oxide ($Al_2O_3$), silicon dioxide ($SiO_2$), titanium dioxide ($TiO_2$), zinc oxide (ZnO), magnesium oxide (MgO), barium oxide (BaO), lead dioxide ($PbO_2$), zirconium dioxide ($ZrO_2$), molybdenum dioxide ($MoO_2$), copper oxide (CuO), vanadium pentoxide ($V_2O_5$), tin dioxide ($SnO_2$), indium tin oxide (ITO), indium zinc oxide (IZO), an Azo compound, or combinations thereof. The metal oxide sol may be dispersed into the base mixture at about 0.1 wt % to about 20 wt % of total liquid medium. In various embodiments, the polar additive may include one or more of alcohols, polyols, such as ethylene glycol, glycerol, meso-erythritol, xylitol, and D-sorbitol, dimethylformamide (DMF), Dimethyl sulfoxide (DMSO), Dimethylsulfone ($DMSO_2$), N-mehtyl-2-pyrrolidone (NMP), an ionic liquid, or combinations thereof. The concentration of the polar additive may be about 0.1 wt % to about 20 wt % of total liquid medium. The carbon nanotubes may be manufactured by a chemical vapor deposition process, a laser ablation process, and/or an arc discharge method.

The foregoing methods provide for a CNT/PEDOT:PSS/metal oxide matrix material layer in a nanometer composite structure, which is uniform in texture when formed on the surface of a substrate. After drying and annealing in a vacuum, the resulting field emission cathode is activated. The formed field emission material layer of the cathode has a low roughness surface with the characteristics of high emitter density, high emission current, low turn on voltage and long lifetime. The batch to batch variation of cathodes is significantly decreased, which is important for industrialized production and application.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used hereinto describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "I" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A method of forming a field emission cathode, comprising:

mixing a plurality of carbon nanotubes and a solution at a particular ratio to form a base mixture, the solution comprising a water stable conducting polymer in a liquid medium;

exposing the base mixture to an ultrasonic dispersion process at a power of greater than 1 $W/cm^2$ and at a frequency of 20-50 kHz;

introducing a metal oxide sol solution to the base mixture to form a field emission material precursor;

exposing the field emission material precursor to an ultrasonic dispersion process at a power of less than 1 W/cm$^2$ and at a frequency of greater than 50 kHz to form a stable solution of the field emission material precursor;

introducing a polar additive into the stable solution of the field emission material precursor to form a final sol solution as a final field emission material precursor;

depositing a layer of the final field emission material precursor on at least a portion of a substrate;

drying the layer of the final field emission material precursor and the substrate at a temperature of 30° C. to 150° C. at atmosphere or under a vacuum such that the layer of the final field emission material precursor forms a uniform gel layer on the substrate;

annealing the gel layer and the substrate at a temperature of 500° C. to 1000° C. under a vacuum such that the gel layer forms a field emission material; and activating the field emission material to form the field emission cathode.

2. The method of claim 1, wherein mixing the plurality of carbon nanotubes and the solution comprises mixing the plurality of carbon nanotubes and the solution comprising a poly(3,4-ethylendioxythiophene)-poly(styrene sulfonic acid) (PEDOT:PSS) polymer and the liquid medium.

3. The method of claim 2, wherein mixing the plurality of carbon nanotubes and the solution comprises mixing the plurality of carbon nanotubes and the PEDOT:PSS solution such that the particular ratio of carbon nanotubes to PEDOT:PSS polymer solution is from 10:1 to 1:10 by weight.

4. The method of claim 1, wherein mixing the plurality of carbon nanotubes and the solution comprises mixing the plurality of carbon nanotubes and the solution, with the liquid medium of the solution comprising water.

5. The method of claim 1, wherein depositing the layer of the final field emission material precursor on the substrate comprises depositing the layer on to the substrate via dip-coating, spin-coating, air knife coating, gravure coating, slot die coating, inkjet printing, spray coating, Meyer bar coating, lithography coating, flexography coating, or combinations thereof.

6. The method of claim 1, wherein introducing the metal oxide sol solution to the base mixture comprises introducing the metal oxide sol solution selected from the group consisting of aluminum oxide ($Al_2O_3$), silicon dioxide ($SiO_2$), titanium dioxide ($TiO_2$), zinc oxide (ZnO), magnesium oxide (MgO), barium oxide (BaO), lead dioxide ($PbO_2$), zirconium dioxide ($ZrO_2$), molybdenum dioxide ($MoO_2$), copper oxide (CuO), vanadium pentoxide ($V_2O_5$), tin dioxide ($SnO_2$), indium tin oxide (ITO), indium zinc oxide (IZO), and aluminum zinc oxide (AZO), or a combination thereof.

7. The method of claim 1, wherein introducing the polar additive into the stable solution comprises introducing the polar additive, selected from the group consisting of an alcohol, a polyol, ethylene glycol, glycerol, meso-erythritol, xylitol, and D-sorbitol, dimethylformamide (DMF), Dimethyl sulfoxide (DMSO), Dimethylsulfone ($DMSO_2$), N-methyl-2-pyrrolidone (NMP), an ionic liquid, or combinations thereof, into the stable solution.

8. The method of claim 1, wherein depositing the layer of the final field emission material precursor on the substrate comprises depositing the layer of the final field emission material precursor on the substrate comprising a metal, stainless steel, an alloy, a conductive glass, or a ceramic.

9. The method of claim 1, wherein activating the layer of the field emission material comprises:

applying an adhesive tape to a surface of the field emission material; and removing the adhesive tape from the surface.

10. The method of claim 1, wherein activating the layer of the field emission material comprises:

applying a curable adhesive to a surface of the field emission material;

exposing the adhesive to a heat source or an ultraviolet light to cure the adhesive and form the adhesive into an adhesive film; and removing the adhesive film from the surface.

11. A method of forming a field emission material precursor, comprising:

introducing a plurality of carbon nanotubes into a liquid medium;

introducing a water stable conducting polymer into the liquid medium comprising the plurality of carbon nanotubes, wherein the plurality of carbon nanotubes is present at a particular ratio to a solution comprising the liquid medium and the polymer;

mixing the plurality of carbon nanotubes and the water stable conducting polymer in the liquid medium via an ultrasonic dispersion process at a power of greater than 1 W/cm$^2$ and at a frequency of 20-50 kHz to form a base mixture;

introducing a metal oxide sol solution into the base mixture;

exposing the base mixture including the metal oxide sol solution to an ultrasonic dispersion process at a power of less than 1 W/cm$^2$ and at a frequency of greater than 50 kHz to form a stable solution of a field emission material precursor; and introducing a polar additive into the stable solution of the field emission material precursor to form a final field emission material precursor.

12. The method of claim 11, wherein introducing the plurality of carbon nanotubes into the liquid medium comprises introducing the plurality of carbon nanotubes into water.

13. The method of claim 11, wherein introducing the water stable conducting polymer comprises introducing a poly(3,4-ethylendioxythiophene)-poly(styrene sulfonic acid) (PEDOT:PSS) polymer into the liquid medium.

14. The method of claim 13, wherein mixing the plurality of carbon nanotubes and the solution comprises mixing the plurality of carbon nanotubes and the PEDOT:PSS solution such that the particular ratio of carbon nanotubes to PEDOT:PSS solution is from 10:1 to 1:10 by weight.

15. The method of claim 11, wherein introducing the metal oxide sol solution to the base mixture comprises introducing the metal oxide sol solution selected from the group consisting of aluminum oxide ($Al_2O_3$), silicon dioxide ($SiO_2$), titanium dioxide ($TiO_2$), zinc oxide (ZnO), magnesium oxide (MgO), barium oxide (BaO), lead dioxide ($PbO_2$), zirconium dioxide ($ZrO_2$), molybdenum dioxide ($MoO_2$), copper oxide (CuO), vanadium pentoxide ($V_2O_5$), tin dioxide ($SnO_2$), indium tin oxide (ITO), indium zinc oxide (IZO), an Azo compound, or a combination thereof.

16. The method of claim 11, wherein introducing the polar additive into the stable solution comprises introducing the polar additive, selected from the group consisting of an alcohol, a polyol, ethylene glycol, glycerol, meso-erythritol, xylitol, and D-sorbitol, dimethylformamide (DMF), Dimethyl sulfoxide (DMSO), Dimethylsulfone ($DMSO_2$), N-methyl-2-pyrrolidone (NMP), an ionic liquid, or combinations thereof, into the stable solution.

17. A method of forming a field emission cathode, comprising:

depositing the final field emission material precursor of claim 11 on at least a portion of a substrate;

drying the final field emission material precursor and the substrate at a temperature of 30° C. to 150° C. at atmosphere or under a vacuum such that the final field emission material precursor forms a layer on the substrate;

annealing the layer and the substrate at a temperature of 500° C. to 1000° C. under a vacuum such that the layer forms a field emission material; and activating the field emission material to form the field emission cathode.

18. The method of claim 17, wherein depositing the final field emission material precursor on the at least a portion of the substrate comprises depositing the final field emission material precursor on the at least a portion of the substrate comprising a metal, stainless steel, an alloy, a conductive glass, or a ceramic.

19. The method of claim 17, wherein depositing the final field emission material precursor on the at least a portion of the substrate comprises depositing the final field emission material precursor on the at least a portion of the substrate via dip-coating, spin-coating, air knife coating, gravure coating, slot die coating, inkjet printing, spray coating, Meyer bar coating, lithography coating, flexography coating or combinations thereof.

20. The method of claim 17, wherein activating the field emission material comprises:

applying an adhesive tape to a surface of the field emission material; and removing the adhesive tape from the field emission material.

21. The method of claim 17, wherein activating the field emission material comprises:

applying a curable adhesive to a surface of the field emission material;

exposing the adhesive to a heat source or an ultraviolet light to cure the adhesive and form the adhesive into an adhesive film; and removing the adhesive film from the surface.

* * * * *